United States Patent

[11] 3,615,645

[72] Inventor John H. Forkner
6037 North Van Ness Blvd., Fresno, Calif. 93705
[21] Appl. No. 749,035
[22] Filed July 31, 1968
[45] Patented Oct. 26, 1971

[54] METHOD OF MAKING FOOD PRODUCT CONTAINING GEL PARTICLES
3 Claims, 1 Drawing Fig.
[52] U.S. Cl. ........................................99/1, 99/83, 99/86, 99/92, 99/94, 99/129, 99/134
[51] Int. Cl. ........................................ A23l 1/06, A23l 1/10, A23l 1/00
[50] Field of Search............................................ 99/129, 83, 166, 86, 1, 92

[56] References Cited
UNITED STATES PATENTS

| | | | |
|---|---|---|---|
| 2,821,477 | 1/1958 | Forkner........................ | 99/129 |
| 2,821,478 | 1/1958 | Forkner........................ | 99/92 X |
| 3,020,164 | 2/1962 | Forkner........................ | 99/83 X |

*Primary Examiner*—Raymond N. Jones
*Assistant Examiner*—James R. Hoffman
*Attorney*—Flehr, Hohbach, Test, Albritton & Herbert ABSTRACT: A food composition consisting of a food material (e.g., cereal flour, starch, dough, etc.,) together with discrete composite food particles dispersed therein is prepared by forming a mixture containing gel-forming matrix material together with separate additive fragments, chilling this mixture to brittlize the same, comminuting the chilled material with comminution of the nongel materials, and then dispersing the resulting composite chilled particles in another food material (e.g., pulverulent material or moist dough).

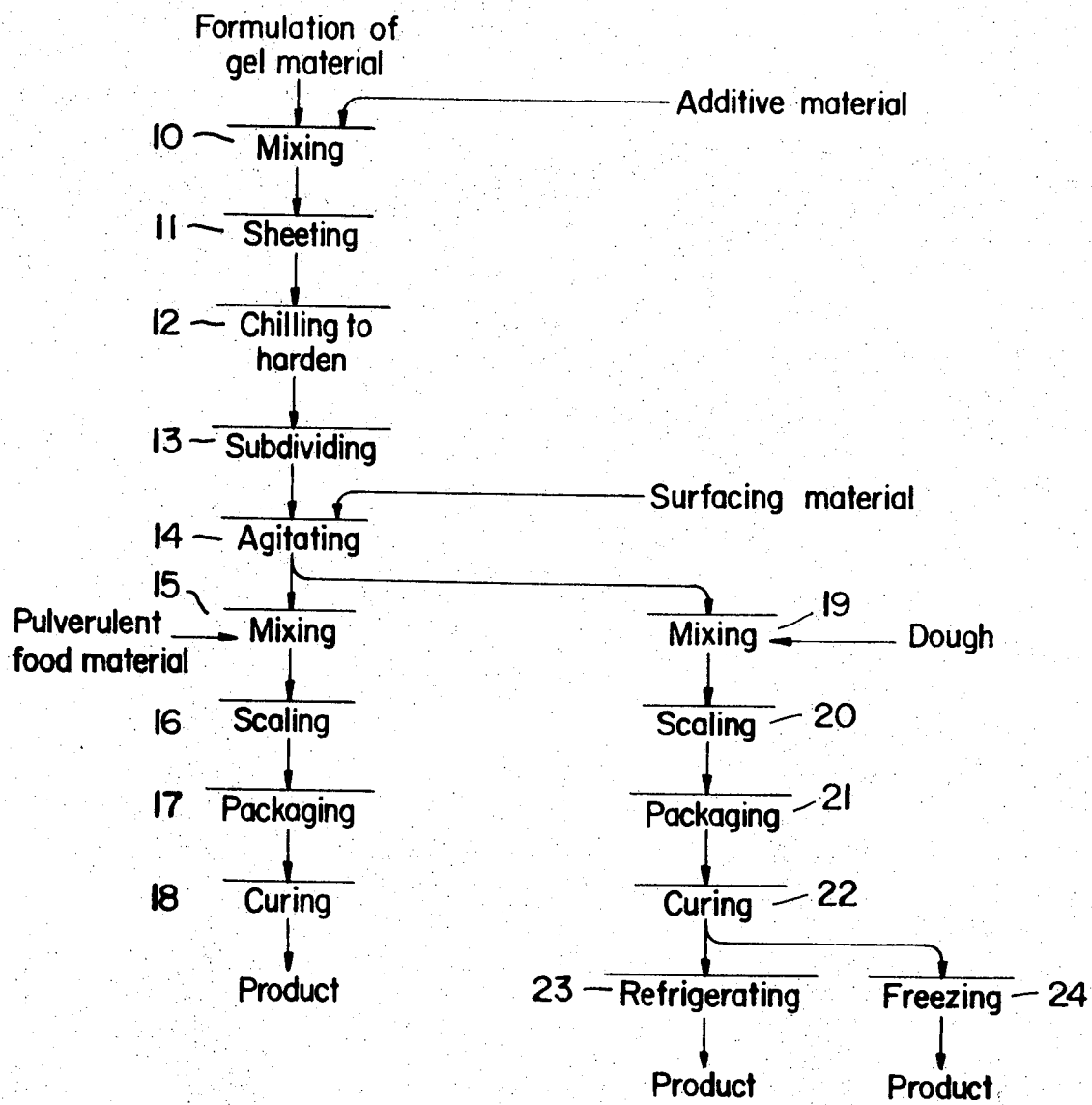

METHOD OF MAKING FOOD PRODUCT CONTAINING GEL PARTICLES

BACKGROUND OF THE INVENTION

In my U.S. Pat. No. 2,821,479, I have enclosed a food composition comprising a mass of pulverulent food material such as cereal flour, starch, and the like, together with discrete gelled food particles dispersed therein. Also I have disclosed a method for the manufacture of such food compositions, involving the formulation of a material with a gel-forming agent, comminuting the formulation after it is partially cured, and then dispersing the comminuted particles in the pulverulent food material. While the composition of my U.S. Pat. No. 2,821,479 is useful for bakery cake mixes, ice cream premixes, gelatin desserts, custards and the like, its application is limited because the dispersed particles are selected from ingredients compatible with a gel. While the composition of my U.S. Pat. Nos. 2,821,478 and 2,821,479 is useful for bakery cake mixes, ice cream premixes, gelatin desserts, custards and the like, its application is limited in part by moisture migration between components of the mix, or to decomposition or deterioration of one or more of the components during storage. Also, its application is limited in part because the particles are a homogeneous gel composition as distinguished from composite particles as hereinafter described. In addition many nongel materials when ground do not form a pourable mass, but on the contrary form a mass in which the particles stick or agglomerate together. The use of finely divided or preground nongel materials with the gel formulation necessarily cause small particles to be homogeneously incorporated in the gel fragments, in which condition they are not ideally suited to lend desired flavor to the final product. At ambient temperature particles of a gel or gelled material tend to be sticky and to adhere together unless surfaced with material like starch or flour. This places limitations on manufacturing and handling procedures.

SUMMARY OF THE INVENTION AND OBJECTS

This invention relates generally to food compositions consisting of a gelled matrix material together with discrete particles of different visible additive particulate dispersed therein. The invention also relates to methods for the manufacture of such food compositions.

One object of the invention is to improve the composition and method described in my aforesaid U.S. Pat. No. 2,821,479.

Another object of the invention is to provide material in the form of nonhomogeneous discrete particles which incorporate both solid and gelled matrix materials in making up the particles, and a method for the manufacture of such particles.

Another object of the invention is to provide a composition consisting of a dry pulverulent food material together with composite discrete particles, the particles being characterized by distinct flavor and including gelled matrix material, and a method for manufacturing the same.

Another object is to provide a composition consisting of dough (refrigerated or frozen) together with gel containing particles, and a method for manufacturing the same.

Another object is to provide particles that are relatively free flowing in bulk, the particles containing a gelled material and being provided with a special surfacing.

Additional objects and features of the invention will appear from the following description in which the preferred embodiment has been set forth in detail in conjunction with the accompanying drawing.

Briefly, the present invention consists of composite particles containing both additive solid and gel matrix materials, the additive materials adding distinct flavor to the composition. The additive materials of the particles present at least one surface which is exposed and forms an exterior surface portion of the particles. Also it consists of particles containing gel material and surfaced to minimize or prevent surface stickiness. The method consists in forming strips or sheets of a gel material mixed with particles of a nongel material in solid form. Such strips or sheets are chilled to brittlize the same, after which they are ground or comminuted to form particles. The particles while chilled are dispersed in the pulverulent food material.

BRIEF DESCRIPTION OF THE DRAWING

The single FIGURE is a flowsheet illustrating steps for carrying out my method.

DESCRIPTION OF THE PREFERRED EMBODIMENT

The character of my improved food particles and compositions can be best understood after describing methods for their manufacture. As indicated in the flowsheet, I first formulate a gel material such as one of the type disclosed in my U.S. Pat. No. 2,821,479. The formulation basically may include sucrose, invert sugar syrup and corn syrup, together with a suitable gel forming agent. Suitable agents may include gelatins, pectins, gums such as tragacanth, arabic, agar and Irish moss, and starch. Various additives can be used such as various flavorings, fruit juices and solids and the like. The formulation is generally cooked and concentrated (e.g., to 80–90 Brix.) by conventional atmospheric vacuum cookers.

Another procedure for formulating the gel material is to convert a portion of the sucrose content by boiling with acid, after which it is combined with the other ingredients and the resulting material boiled and gradually concentrated. The formulation may also include suitable dissolved coloring and flavoring.

To the gel material, generally after cooling to a lower temperature (e.g., 140°F.), I add in step 10 an edible material in the form of solid fragments or particles. The additive material may consist of the meat of any of the more common nuts, such as walnuts, hazelnuts, almonds, pecans, brazilnuts, coconut and the like. It may also consist of solids derived from fruits and berries, such as fragments of dried fruit. The fruits and berries may be preserved with sugar and concentrated to a consistency of stable character (e.g., above 68 Brix.) and paste like properties. Also it may consist of particles of preserved or dried fruit products like dried of candied orange peel, pineapple, etc. Confections as gum drops, nougat, caramel, may be subdivided and incorporated as described. Intermixing of the particles with the gel material can be carried out in a suitable mixing device. As will be presently explained the added particles retain their visible identity in the final product.

Generally it is desirable to formulate the gel material and then maintain it at a boiling temperature for a period of the order of 30 minutes, during which time the material is gradually concentrated (e.g., to the order of from 50 to 82 Brix.). Another procedure is to boil at atmospheric pressure for a short time and then concentrate in a vacuumized kettle. The additive material can be introduced at various times, such as at the time the gel material is first formulated, before concentration has been completed, or after the gel material has been concentrated. However, it is usually deemed desirable to supply additive material immediately after concentration with separate mixing action and before any substantial gelling. In general formulation and preparation of the gel matrix material can follow conventional procedures for the manufacture of so-called "gums and jellies."

The material obtained from step 10 with its sugar content ranging generally from 80 to 85 Brix. and containing the additive fragments or particles, is then formed into sheets or slabs as indicated in step 11. Sheeting is generally facilitated by some cooling of the material, as for example, cooling following step 10 to a temperature of the order of 120°F. to 32°F. Sheeting can be accomplished in any suitable sheeting or extrusion device. The term "sheeting" is intended to include the formation of molded extrusions, molded segments, bars and strips as well as sheets or slabs. By way of example, the sheets may range in thickness from about one-fourth to five-eighths inches. As the sheets are formed they can be deposited on a bed of starch and then permitted to cool before further handling. The starch bed may, for example, be a layer of starch on a conveyor belt having a nonadhering coating (e.g., Teflon).

After the sheets have been formed and cooled, they are chilled in step 12 to make the material hard or brittle. Chilling can be carried out by subjecting the slabs or sheets to a low temperature atmosphere to chill and make the sheets completely friable. In general, such sheets are hardened sufficiently for subdividing at about 0°F. and they become quite brittle at lower temperatures.

By way of example the sheeting technique described in my U.S. Pat. No. 2,821,477 can be used for sheeting and chilling. In this instance the material is deposited in slabs about ½ inch thick and 4 inch wide by 8 inch long, on a bed of starch. The slabs are then set by contacting them with circulating air at a temperature of 30° F. for about 5 minutes, after which they are placed in a cold atmosphere at about −48° F. to make them brittle.

In the procedure described above it is desirable for some curing to take place during or immediately before sheeting and before chilling to a low temperature. This serves to facilitate handling of the material. By "curing" I have reference to complex changes taking place in the presence to a gelling agent to effect the formation of a gelled consistency. Both time and temperature factors are involved. In other words curing takes place over a period of time and at a temperature conducive to curing.

After the brittlizing of the slabs in the chilling operation 12, the slabs are subdivided in step 13 to form a mass of free-flowing particles. Care is taken during comminuting to maintain a low temperature, thereby avoiding the adherence of particles together. Following comminuting in step 13 which can be carried out by use of conventional hammer mills fitted with slicing knives, the material can be stored at low temperature (e.g.,- 20°to 40°F.), or may immediately be dispersed in another food material in step 15. The food material in step 15 may be at ambient temperature, but preferably it is at a temperature somewhat below ambient such as a temperature of the order of 30°to 45°F. After preliminary mixing the composition may be further processed by agitation and mixing, dividing into measured portions, scaling and packaging, during which time the temperature of the particles may remain below ambient to delay complete curing. In such event curing is completed after such operations.

For larger scale operations, the uncured or partially cured fluid confection with the additive particles may be fed to a chilling roll and spread evenly by compression rolls. The chilled and brittle material can be continuously scalped from the roll, and the broken pieces thus obtained can be used as such or reduced in size by a hammer mill. Fines can be removed by screening and returned to the process, or may in some instances remain with the larger pieces. Chilling while on the chilling roll can be accelerated by applying streams of cold air or other refrigerant.

The particles produced as described above may have surface stickiness and may adhere together at ambient or higher temperature, having reference to the particles in bulk without incorporation with another material, such as cereal flour. To prevent or minimize such stickiness, and to provide particles that are free flowing in bulk, I can provide a surfacing of an edible material having a melting point well above ambient. Particular reference can be made to fats or lipids, such as animal or vegetable fats, fat-containing materials like chocolate, or a synthetic fat like Myveset, (a monoglyceride made by Eastman Kodak Company). The animal or vegetable fat may be of the hydrogenated type. Such a surfacing material can be sprayed in liquid form (step 14) on the surfaces of the particles, after removal of fines and while the particles are chilled and being agitated e.g., in a fluidized bed) whereby it immediately congeals as a surfacing film or layer. Particles so surfaced remain free flowing in bulk, thus facilitating storage for subsequent use or marketing as such. It is also desirable to employ such a surfacing when the particles are to be used with other food materials as previously described.

The food material used may be a pulverulent material of the type referred to in my U.S. PAT. No. 2,821,479. Thus it may be a cereal flour, pulverized sugar, or starch, or dry premixes containing one or more of the foregoing, such as bakery cake mixes, pancake mixes, dry powdered ice cream premixes, gelatin desserts, custards, or processed dry cheese mixes. It may be a premix ingredient such as cereal flour which is later mixed with other pulverulent material to make a complete premix. The dispersion of the comminuted particles into the pulverulent food material can be carried out by various types of mixing equipment whereby the chilled particles are dispersed in the pulverulent food material to produce a relatively homogeneous mix. The amount of comminuted particles dispersed in the pulverulent food material may vary from about 5 to 50 percent by weight of the final product. Higher percentages can be used for special products such as fruit cake premixes.

After step 15 the mixture can be subjected to scaling at 16, followed by packaging 17. After packaging and over a holding or storage period curing takes place as indicated by step 18. Such curing involves the action of gelling agents and probably dehydration due to moisture evaporation or transfer of moisture to the adjacent dry material. After final curing the gel matrix material is of proper consistency and hardness to retain the additive particles. Curing takes place within the package during a holding period or during normal storage.

When a mix is prepared as described above the moisture content of the particles may be higher than desired e.g., above 10 percent). In such instances the mix can be subjected to a drying operation, preferably under vacuum, to reduce the moisture content to a value more compatible with that of the pulverulent material e.g. below 10 percent).

As indicated by step 19 the food material in which the chilled particles are mixed may be a moist dough. The dough may be of conventional formulation, containing ingredients such as cereal flour, milk solids, seasoning and the like for making various bakery products such as bread, rolls, biscuits and the like. It may be more or less leavened and may contain leavening agents such as yeast or baking soda. Mixing with the dough can be carried into as a continuous or batch operation and involves adding the particles to the dough during machine working or mixing, whereby the particles are distributed in the desired manner. The amount of material added to the dough may vary but may for example range from 10 to 25 percent by weight.

Following mixing in step 19 the dough preferably is held for a period during which time the particles and the dough attain a common temperature level, with some firming and curing of the gel content of the particles. The gel material during this period may undergo some setting or curing whereby it more effectively functions as a matrix for the added particles.

After step 19 the dough may be scaled in step 20 and directly packaged in step 21 for marketing, also it may be subjected to further processing such as proofing, molding, extruding, shaping or the like. Curing may also occur after packaging as indicated by step 22. As indicated at 23 the composite dough material may be refrigerated and retained in refrigerated condition during storage and marketing. As indicated at 24 the composite dough material may be frozen and marketed as a frozen product. Whether refrigerated or frozen the material should be packaged for convenient use by the consumer, such as in molded forms ready for baking, or in so-called "chubs" which can be subdivided by slicing. Heat shrink packages can be employed to retain the dough compressed.

Since the additive particles are introduced into the gel formation before chilling and comminuting, the bulk of the particles produced by comminuting may contain both gel material and additive particles. Also the composite material is subdivided in the comminuting step whereby most of the composite particles produced after comminuting have external surfaces formed in part by gel material functioning as a matrix, and also formed in part by fractured surfaces of the additive material. More specifically, if the additive material is nut meat, then the bulk of the composite fragments produced in comminuting step 13 have external surfaces consisting of gel material, and also in part by freshly fractured surfaces of the nut meat. The same applies to the other additive materials previously specified.

Because the additive material is subdivided in the comminuting step 13, its size at the same time of introduction may be considerably greater than the size of the comminuted particles. By way of example, nut meat added in step 10 may be such that the bulk of the fragments remain upon a ¼-inch-mesh screen but pass through a one inch mesh screen. The composite comminuted material obtained from step 13 may be of such a size that the bulk of the particles remain on a 3/16-inch-mesh screen, but pass through a ⅝ screen.

Because the added nongel fragments or particles are subdivided while firmly contained in a gel matrix, the fractured surfaces of the nongel material thereby produced are visible as a part of the surface area of the final composite particle. This provides particles that are more attractive than particles comprising a nongel material entirely enveloped in a gel material.

Another advantage of the present method and product is that keeping properties of the additive nongel material are extended or enhanced by the protective action of the sugar containing matrix. Thus, the composite particles may remain dispersed in cereal flour or other farinacious material (e.g., premix) for long periods of time without deterioration.

The keeping properties of the composite particles are further enhanced by surfacing of the particles with a semipermeable protective film or surface layer as previously described. Such a surfacing (e.g., Myveset) aids in promoting keeping properties and long shelf life when the composite particles are dispersed in cereal flour or other farinacious material.

In the foregoing reference has been made to surfacing the composite particles with a fatlike agent (e.g., Myveset) to reduce surface stickiness and minimize moisture migration. In some instances it is desirable to apply such a surfacing to the additive material (e.g., nut meat, dried orange peel, etc.) before it is mixed with the gel material. This aids preservation of the additive material and tends to minimize moisture migration between the additive and gel materials.

An example of the invention is as follows:

A gel material was prepared from ingredients as follows:

| | | |
|---|---|---|
| Sugar | 30 lbs. | |
| Invert Syrup | 7½ lbs. | |
| Corn Syrup | 50 lbs. | |
| Starch | 12½ lbs. | |
| Water | 50 lbs. | |
| Salt | 1 lb. | |
| Flavoring: | | |
| Almond Oil | 2 ounces | |
| Lemon Oil | 1 ounce | |

The above ingredients, without the flavoring, were added to a vacuum equipped, steam-heated, scraper agitated kettle. The starch was initially dissolved in a portion of the water. Boiling at atmospheric pressure was conducted for 10 minutes, after which a vacuum of about 28 inches mercury column was applied and the batch concentrated to 84 Brix. On release of the vacuum the flavoring material of almond and lemon oil was added. The product was removed from the steam kettle and placed in a water cooled tilting kettle where it was cooled to a plastic state at about 120° F. at which time the nuts were mixed in, whereby they became incorporated in the concentrate. The mass was deposited on a starched chilling roll and rolled to an average thickness of about one-fourth inch. The surface of the rolled out material was noticeably irregular. The roll was internally chilled, and also pulverized dry ice was sprinkled directly upon the surface of the concentrate on the roll. Before completing a single pass, the chilled material was scalped off of the roll with presubdividing of the material into broken pieces of sheetlike shapes having a thickness of about one-fourth inch and planar dimensions in the order of one inch. These presubdivided relatively large pieces were retained as a particulate mass by continuous agitation while the temperature was permitted to increase from their brittle state of minus 20° F. to a more sliceable temperature of about 25° F. The pieces were dusted with about 10 starch with some further increase in temperature and then they were immediately introduced into a hammer-type mill provided with sharp slicing blades whereby they were subdivided into sizes ranging mainly from one-eighth to one-fourth inch. Oversized particles recirculated before defrosting. Undersized particles or fines were provisionally screened off with excess starch and employed in the pulverulent cake premix later described. The composite particles while still chilled and free flowing, and while being agitated or fluidized by vibration, were coated with cocoa butter applied by a pressure atomizer. The butter was warm and in liquid form, but immediately congealed upon contact with the chilled particles. The amount of cocoa butter applied was about 3 percent of the weight of the particles. The chilled composite particles were then intermixed with a pulverulent cake mix containing mainly cereal flour, the mixing serving to homogeneously disperse the particles. Upon examination of the individual particles it was found that most of them were composite and that they comprised both gelled material and the nongel nut meat. It was noted that the fracture surfaces of nut meat were exposed and coated at many of the exterior surfaces of the particles. Also it was noted that during mixing with the flour and during weighting and packaging particles remained hard and relatively nonsticky.

EXAMPLE II

The above formula in example I was modified by substituting 3 pounds of gelatin for the starch. After concentrating at atmospheric pressure to a temperature slightly above 240° F., I introduced 20 pounds of a standard caramel mix (80 Brix.) containing sugar, albumen and fat. This mix was then processed as described in example I to produce composite chilled particles. The particles were then added to a conventional cookie dough. Upon baking it was observed that the particles expanded (presumably due to the albumen content) creating an attractive raised background. Upon cooling of the cookies the albumen particles collapsed giving a novel white cameo effect which highlighted and accentuated the position and visibility of the nuts contained in the particles. An analysis of the composite particles after incorporation in the dough showed a moisture content of the other of 10 percent.

EXAMPLE III.

The gel composition of example I was modified to correspond in general to a puffalbe confection (e.g., malted milk balls). Thus the invert syrup was replaced with malt syrup and starch was replaced with milk solids (casein, etc., as malted milk. Concentration was in the order of 88 Brix. After forming of the final coated composite particles, they were mixed with a dry starch in the proportions of 2 parts starch to 1 part nut pieces. The mass was dried by subjecting it to a vacuum of 29 inches mercury column in a vacuum shelf drier. Drying time was 6 hours at 140° F., after which the particles were removed and excess starch separated. Moisture analysis of the particles, which had puffed to about twice original size while still encasing nut meats, was 2 percent. The articles remained puffed when subsequently dispersed in a pulverulent dry cake mix. Coating in this instance was with Myveset, in place of the cocoa butter described in example I. The approximate doubling in size of the particles in vacuum and dehydration was accompanied by substantial surface coating of the final product with Myveset to inhibit absorption of moisture into the particle from exterior sources.

EXAMPLE IV.

Particles are produced substantially as described in example I. However, as the chilled brittle material is scalped off the chilling roll it is immediately fed to a corrugated breaking roll. This produces larger sized particles averaging about ¼ inch thick, but fewer fines. While brittle, and agitated, all the composite particles are coated with melted Myveset atomized under pressure, which immediately hardened on contact with the particles. The chilled coated particles are intermixed with a moist dough of the type used for making leavened rolls, the amount of particles being added about 15 percent of the weight of the dough. After incorporation of the particles in the desired distribution in the dough, the dough is subdivided and molded while the particles are still intact and nonsticky due to their low temperature. After packaging the mass is heated to proofing temperature (e.g., 80°F.). During the proofing period some setting or curing of the gel material takes place. Thereafter the package is reduced in temperature for marketing as refrigerated or frozen products to be baked by buyer.

EXAMPLE V.

The procedure was substantially the same as described in example I. However, after the particles were subdivided in their brittle state and during agitation, they were provided with a surfacing of Myveset applied in atomized form to the chilled particles. This served to provide a thin coating of the surfaces of both the gel and nongel materials. Thereafter, the coated particles were intermixed with cereal flour as described in example I.

When composite particles are incorporated in yeast raised doughs, I may incorporate a chemical to inhibit fermentation in the gel during its processing. Also I may concentrate the gel material to a higher solids content (e.g., 90 Brix), and I may employ additional coating to minimize moisture migration e.g. from 3 percent of example I to 5 percent). Coating the particles is considered to be particularly helpful if acid is present, such as fruit ingredient, because the coating minimizes acid contact with the dough which reduces the volume of leavening action.

Example I has been repeated in a number of instances with different additive particles to confirm their effectiveness. Also the gel has been modified in flavor and color to correspond and be compatible with the additive. Thus, chopped glace candied cherries have been used in place of the nuts with the gel material colored red. In another instance chopped candied pineapple was used, whereby the gel material was colored yellow and a pineapple flavor was imparted. In another instance I used dried apricots, having a moisture content of about 20 percent the pieces being coated with Myveset. Other dried particles so coated were employed, including orange peel and dates. During the course of such tests it was found that novel results were obtained by prechilling and subdividing different flavored and colored gum drops and blending them with a gel matrix, followed by processing with refrigeration and coating as described in example I. This formed a gum drop type of additive material which provided visible particles of different colored and flavored compositions.

It will be evident from the foregoing that food compositions utilizing the present invention have substantially greater adaptability and usefulness than the composition disclosed in my U.S. Pat. Nos. 2,821,478 and 2,821,479. One reason is that the particles are composite in that they include gel material whose function is that of a matrix or bonding agent, and visible additive particles of differing properties than the matrix. The additive particles may be further subdivided after incorporation with the matrix, with minimum formation of fines or undesired sizes. The additive materials have most of their surfaces encased within the gel sugar matrix, and therefore their desirable properties are better retained when mixed with mediums such as cereal flour or dough. Also the eating properties of the additives are improved. In a baked dough crumb the matrix, which may be expanded, tends to provide a cameo effect to accentuate the presence and location of the additive particles. Coating of the composite particles, with or without surfacing of the additive particles, serves to stabilize and protect both the composite particles and the additive material, thus preventing deterioration during storage and after being mixed with other materials (e.g., cereal flour, premixes or dough).

With respect to subdividing various types of nongel material to a final desired state of subdivision, it should be noted that the nongel particles are supported in gel matrix and subdivided while the matrix is at a low temperature and in hard or brittle condition. This provides composite particles conforming to desired size specification with a minimum amount of desired fines.

Assuming that the composite edible particles are dispersed in pulverulent material like cereal flour or other farinacious material to provide special products, such products have improved shelf life due to the manner in which the gel material tends to insulate the nongel material from direct contact with the farinacious material. Also, as hereinafter described, shelf life can be further improved by application of a surfacing medium such as Myveset.

I claim:

1. A method for the manufacture of a food product in the form of discrete composite particles adapted to be incorporated in other food materials comprising the steps of boiling a matrix food material containing sugar, a gel-forming agent and water, cooling the material to plastic condition, incorporating discrete flavor-imparting edible solid nongel additive particles with said cooled plastic matrix material, forming the plastic mixture of matrix material and additive particles into slabs, chilling the slabs to a temperature of about 0° F. or lower for a period of time sufficient to cause the same to become brittle, and then subdividing the brittle material, thereby subdividing some of said additive particles, to provide composite particles of the size desired while maintaining said brittle material at a low temperature to avoid adherence of particles together, whereby a mass of free-flowing composite particles is obtained.

2. A method as in claim 1 in which the subdivided material while chilled is surfaced with a lipid material.

3. A method as in claim 2 in which the chilled composite particles after surfacing of the same are dispersed in another discrete food material before the matrix material has cured, whereby curing of the matrix material takes place thereafter.